(No Model.)

K. W. HEDGES.
SPEED INDICATOR.

No. 338,966. Patented Mar. 30, 1886.

Witnesses.
Percy B. Hills.
Robert Everett.

Inventor
Killingworth W. Hedges.
By
James L. Norris.
Atty.

UNITED STATES PATENT OFFICE.

KILLINGWORTH WILLIAM HEDGES, OF WESTMINSTER, COUNTY OF MIDDLESEX, ENGLAND.

SPEED-INDICATOR.

SPECIFICATION forming part of Letters Patent No. 338,966, dated March 30, 1886.

Application filed January 27, 1886. Serial No. 189,958. (No model.) Patented in England February 18, 1885, No. 2,244; in France September 7, 1885, No. 171,054, and in Belgium October 6, 1885, No. 70,414.

*To all whom it may concern:*

Be it known that I, KILLINGWORTH WILLIAM HEDGES, a citizen of England, residing at Westminster, in the county of Middlesex, England, have invented a new and useful Speed Indicator, (for which I have obtained a Patent in Great Britain, No. 2,244, dated February 18, 1885,) of which the following is a specification.

It has been proposed to measure velocity of rotation by ascertaining the height to which fluid is raised at the circumference and depressed at the center by centrifugal force in a rotating vessel. The heights or depths due to different velocities do not follow the proportions of those velocities, and therefore with such instruments it is not easy, without specially graduated scales, to determine the velocity due to a given height or depth. Now, according to my invention, instead of allowing the liquid to rise to various heights at the periphery of the vessel, I limit the height to which it can rise by putting on the partially-filled vessel a cover which is flat over all that part of its surface which the liquid can touch. In that case the depth to which the middle of the liquid becomes depressed is directly proportional to the velocity of rotation. I can, therefore, by inspection of an equally-divided scale, ascertain at once the speed of rotation corresponding to an observed depression of the middle of the liquid.

Figure 1:
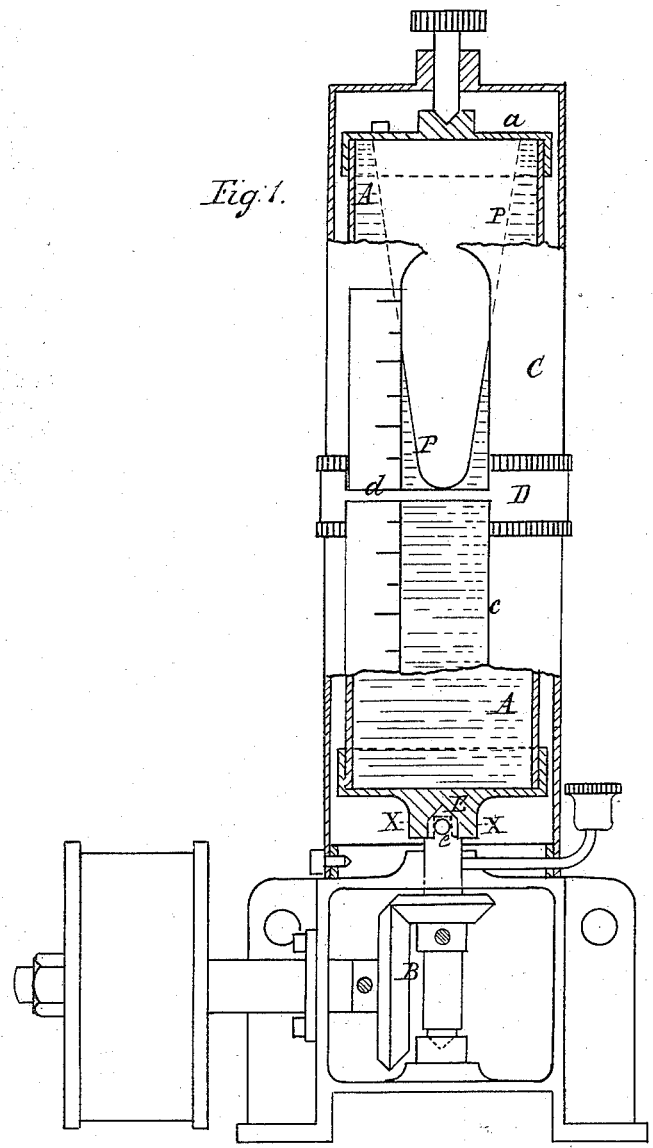
Figure 2:
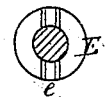

Figure 1 of the accompanying drawings is a side view, partly in section, (with portions of the casing removed to show the interior,) of an instrument according to my invention. Fig. 2 is a sectional plan at X X of Fig. 1.

A glass tube or cylinder, A, is mounted so as to revolve freely on a vertical axis, being driven by bevel-gear B, or otherwise, at a speed which has a known ratio to the speed of the rotating shaft whose velocity is to be indicated. I inclose the tube A, which is covered by a flat top, $a$, (which may be a cap cemented on, as shown, or may be of glass solid with the tube itself,) within a stationary tubular casing, C, having slits $c$ through its opposite sides, so that by looking through them the depression of the liquid at its middle can be seen. A ring, D, having cross-wires $d$, is fitted to slide along the casing C, which is graduated by equal divisions. While the tube A and the liquid in it revolve, the ring D is slid to such a position that its nearer and its farther wires $d$ are brought into coincidence with the vertex of the central parabolic depression of the liquid indicated by the curve P. The observer can then read on the scale of the casing the speed of rotation. The quantity of liquid in the tube has in the first place to be adjusted to the graduations of the scale, or the scale can have several of its divisions determined by actual trial with a given quantity of liquid, but the level which the liquid should have when at rest being once determined, it is only necessary afterward to raise or reduce the liquid to that level before taking an observation of speed.

The tube A may be driven, as shown in Fig. 2, by a pin, $e$, entering a cross-cut in the lower boss, E, of the tube, this connection admitting of the tube being readily removed and replaced.

Having thus described the nature of my said invention and the best means I know for carrying the same into practical effect, I claim—

A speed-indicator consisting of a glass tube partly filled with liquid and caused to revolve on a vertical axis, the tube having at the top a flat cover to arrest the rise of the liquid, and being inclosed in a stationary casing graduated with equal divisions, substantially as herein described.

In testimony whereof I have hereunto signed my name to this specification, in the presence of two subscribing witnesses, this 11th day of January, A. D. 1886.

KILLINGWORTH WILLIAM HEDGES.

Witnesses:
 JNO. DEAN,
 GEO. J. B. FRANKLIN,
 *Both of 17 Gracechurch Street, London.*